United States Patent [19]
Leonard

[11] 3,884,110
[45] May 20, 1975

[54] MUSICAL CYCLE DIFFERENTIATION AID
[76] Inventor: Verna M. Leonard, 8701 Highway 41, Fresno, Calif. 93710
[22] Filed: July 24, 1974
[21] Appl. No.: 491,251

[52] U.S. Cl. .................. 84/471; 84/474; 84/482
[51] Int. Cl. ........................................ G09b 15/02
[58] Field of Search ...................... 84/470–474, 84/478–482

[56] References Cited
UNITED STATES PATENTS

| 359,829 | 3/1887 | Withers | 84/474 |
|---|---|---|---|
| 428,806 | 5/1890 | Donovan | 84/474 |
| 2,028,809 | 1/1936 | Shannon | 84/471 |
| 2,542,235 | 2/1951 | Clopton | 84/474 |
| 3,395,600 | 8/1968 | Leonard | 84/478 |
| 3,472,117 | 10/1969 | Iverson et al. | 84/474 |
| 3,481,241 | 12/1969 | Gaillard | 84/474 |

Primary Examiner—Stephen J. Tomsky
Assistant Examiner—John F. Gonzales
Attorney, Agent, or Firm—Ralph S. Branscomb

[57] ABSTRACT

The invention is for the purpose of teaching the relationship between the musical cycle of fourths and the cycle of fifths and comprises two rotatable dials with the respective cycles peripherally displayed thereon, and two associated panels having notches or markings spaced to register with a root tone on a piano keyboard and the note on each side of the root tone which is removed therefrom by an interval of a fourth or fifth.

4 Claims, 5 Drawing Figures

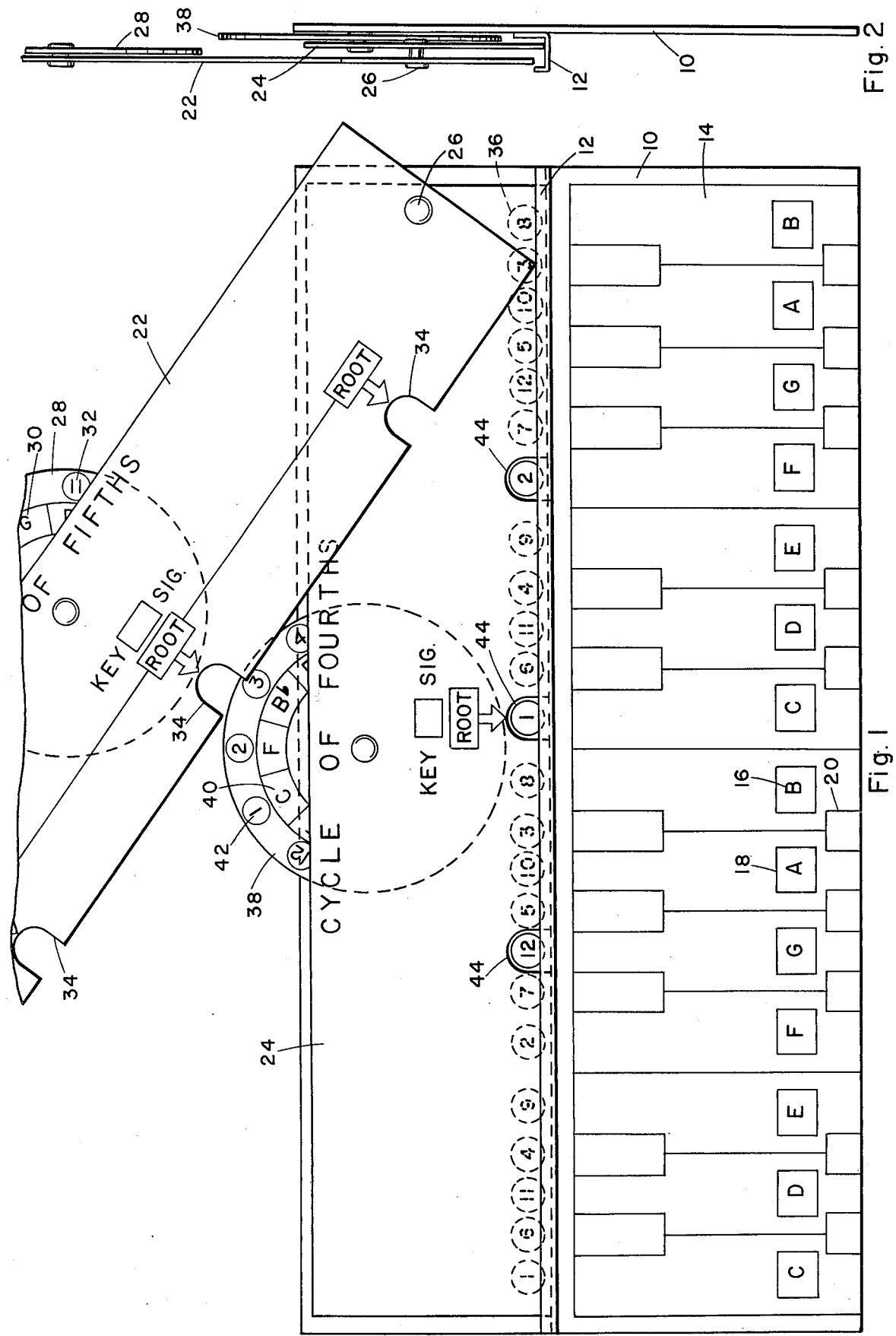

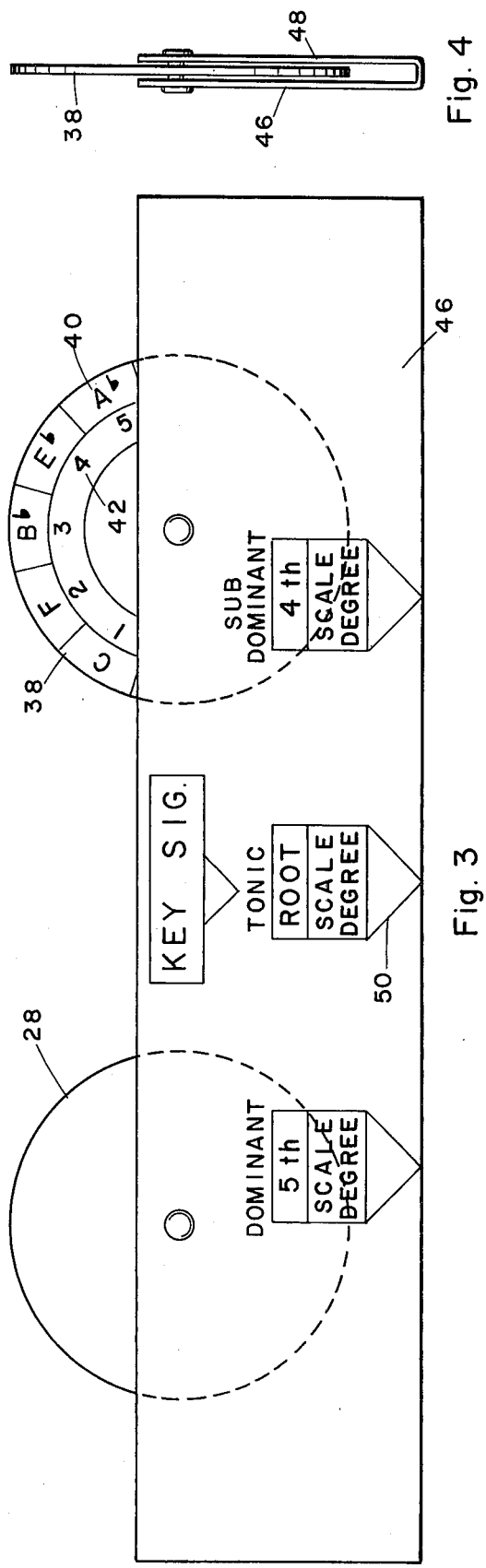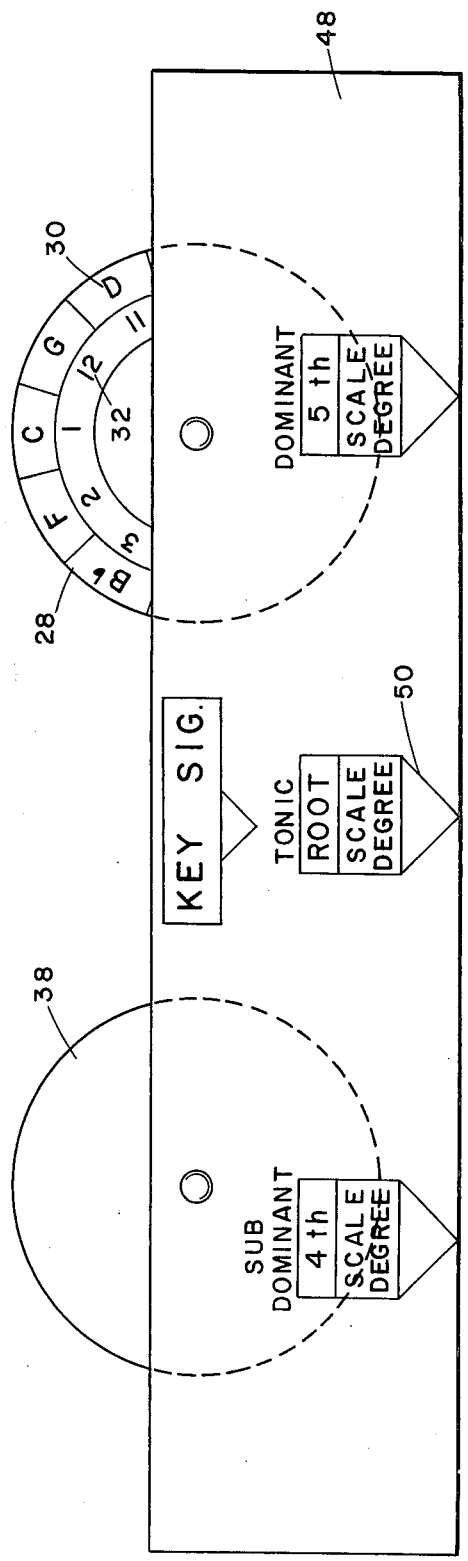

MUSICAL CYCLE DIFFERENTIATION AID

BACKGROUND OF THE INVENTION

It is a fact of music theory that certain notes tend to naturally lead to certain other notes and the related key signatures and chords do likewise. This knowledge has led to the structuring of all the notes and related key signatures in music into orderly arrangements called cycles of fourths and cycles of fifths, each cycle being the reverse of the other and producing note sequences that are inversions of one another. Thus both cycles can be used to demonstrate the natural grouping or sequencing of sounds and are so used, resulting in confusion in the mind of the music student as to the relationship between the two cyclic arrangements.

SUMMARY OF THE INVENTION

The invention is a teaching aid which teaches the relationship between the musical cycle of fourths and fifths and comprising two selectively exposable panels, each having a rotatable partially visible dial thereon which displays in peripheral segments the consecutive scale tones of the cycle of fourths or fifths, respectively. The bottoms of the panels have accurately spaced notches or markings which register with the three keys of a piano keyboard or a representation of same which represent a root tone and the two notes removed therefrom by an interval of a fourth or fifth.

In one embodiment the scale tones on the dials are numbered consecutively according to order of the cycle of fourths and the keys on a piano keyboard representation are numbered accordingly. The panels slide in a tray above the keyboard and have notches in the lower margins which selectively expose the keyboard numbers to identify the required keys and related scale tones.

BRIEF DESCRIPTION OF THE DRAWINGS

FIG. 1 is a front view of the one embodiment of the invention;

FIG. 2 is an end elevation view as taken from the right hand end of FIG. 1;

FIG. 3 is a front view of the second embodiment of the invention;

FIG. 4 is an end elevation view as taken from the right hand end of FIG. 3; and

FIG. 5 is a view as taken from the rear of FIG. 3.

DESCRIPTION OF THE PREFERRED EMBODIMENTS

In order to understand the invention, the nature of the cycle of fourths and the cycle of fifths will be briefly described.

The cycle of fourths is an ordered repetitive array of all the scale tones in the western musical scale which is produced as follows. The cycle begins with C, and the note which forms the forth diatonic scale interval with C, in the key of C, represents the next note of the cycle. This note is F. The note which forms the fourth diatonic scale interval with F, in the key of F, is the next note in the cycle, $B^b$, and so forth until all the notes are represented and the cycle repeats at C. The cycle of fifths is produced analogously by using the fifth diatonic interval, and results in an exact reversal of the cycle of fourths.

In both of these cycles, any individual scale tone (note) therein has a natural tendency in music to be associated with the two adjacent notes.

With reference now to FIG. 1, the embodiment illustrated therein comprises a planar backing or base 10 having a preferably integral tray 12 across the middle and a representation of a piano keyboard 14 below. The scale tones of the individual keys may be identified as at 16, or the squares 18 may be left blank, as are the squares 20 so that the student may write in the tone names himself.

Two panels 22 and 24 are provided and are preferably pivoted together at 26 so that panel 24 can be exposed. The panels rest in the tray 12 and are free to slide back and forth. Panel 22 is marked "Cycle of Fifths," and pivoted to the rear side with a portion exposed is a disc or dial 28 which has displayed in consecutive peripheral segments the names of the scale tones 30 in the cycle of fifths which are consecutively numbered as at 32.

The lower margin of panel 22 is notched in three places 34, the notches being spaced such that when the panel is in the position of panel 24 the central notch falls over a note in the keyboard 14 which is removed from the notes indicated by the side notches by a fifth interval. In the position illustrated, if panel 22 were lowered it would select the C key, the F key on the left and the G key on the right, corresponding to the order of the scale tones in the cycle of fifths (see the dial in FIG. 5).

Above the keyboard and the tray 12 is a row of numbers 36 which orders the piano keys as they occur in the cycle of fourths, so that when a panel is in the lowered position it covers all the numbers but the three which are exposed through the notches.

Panel 24 is strictly analogous to Panel 22, but relates to the cycle of fourths. A rotational dial 38 displays the scale tones of the cycle of fourths at 40 and the consecutive numbers 42, and notches 44 indicate keys of the keyboard which are adjacent in the cycle of fourths, which are the G, C, and F keys.

The student using the device can slide both panels to register the central notches of the panels with any key on the keyboard, and then by alternate use of the panels will be apprised of the fact that the three scale tones selected are the same in either case, only the positions of the outside tones being reversed.

Another embodiment of the invention is shown in FIGS. 3, 4, and 5, the primary differences being the two panels 46 and 48 are fastened back-to-back and may be the halves of a folded sheet of stiff paper or the like, and the entire unit registers directly with a piano keyboard. The dials are similar and retain the same marking, and the notches in the panels of the first embodiment have been replaced with indicia 50 which point out the appropriate piano keys. To switch between the cycle of fourths and fifths, the unit is reversed.

The portion of the piano keyboard 14 which is represented in FIG. 1 can well be more or less than the portion illustrated. To make an ideal unit in which every key could be identified as the root, twenty-eight keys on the keyboard must be shown, or four more than appear in FIG. 1 which was restricted due to space limitation.

I claim:

1. A device for teaching the relationship between the cycle of fourths and the cycle of fifths in music comprising:
   a. first panel and a second panel, each having:
      1. a front face and a rear face; and
      2. a disc rotatably mounted on the rear face and extending partially beyond the respective panel;
   b. said discs each having displayed consecutively in twelve peripheral sectors the scale tone names of a musical cycle;
   c. said first panel having means to indicate the position on a piano keyboard of a root tone and the two tones which are a fifth interval removed from said root tone on the opposite sides thereof;
   d. the cycle displayed on the disc mounted on said first panel being a cycle of fifths and the cycle displayed on the disc mounted on said second panel being a cycle of fourths;
   e. said second panel having means to indicate the position on a piano keyboard of a root tone and the two tones which are a fourth interval removed from said root tone on opposite sides thereof; and
   f. said panels being mounted together for alternate visibility and use by the student.

2. Structure according to claim 1 and including a backing sheet having a representation of a portion of a piano keyboard on the lower portion thereof and an elongated tray mounted on said sheet along the upper margin of said representation; said panels being pivoted together at one end and slideably disposed in said tray.

3. Structure according to claim 2 wherein the sectors of each of said discs are consecutively numbered from one to twelve beginning with the scale tone C according to the order of the cycle of fourths and the representations of the keys on the piano keyboard representation are similarly numbered according their respective scale tones, the keyboard numbers appearing in a row above said tray;
   both of said means being notches in the lower margins of the respective panel and spaced to register with and expose the numbers identifying the keys representing the respective tones.

4. Structure according to claim 1 wherein said panels are mounted together in back to back relationship and said means comprise markings on the lower margins of said panels precisely spaced apart to register with the actual keys on a piano keyboard representing the respective scale tones, whereby by placing the device alternately forward and backward on the keyboard fourth and fifth intervals can be directly seen on the keyboard.

* * * * *